United States Patent [19]

Tolan

[11] Patent Number: 4,811,601
[45] Date of Patent: Mar. 14, 1989

[54] METHOD AND APPARATUS FOR MEASURING THE CHANGE IN VOLUME WITH CHANGE IN TEMPERATURE OF LIQUID IN TANKS

[76] Inventor: Peter J. Tolan, 30 Greenfield La., Scituate, Mass. 02066

[21] Appl. No.: 540,799

[22] Filed: Oct. 11, 1983

[51] Int. Cl.⁴ .............................................. G01F 23/00
[52] U.S. Cl. .................................... 73/29 B; 73/149; 73/240 R; 73/290 V; 73/295
[58] Field of Search ........................ 374/55, 56, 4, 201, 374/115, 116; 73/290 R, 290 B, 291, 313, 290 Y, 149, 295

[56] References Cited

U.S. PATENT DOCUMENTS

| | | | |
|---|---|---|---|
| 1,905,607 | 4/1933 | Sato | 374/55 |
| 2,625,043 | 1/1953 | Tapp | 374/116 |
| 3,572,119 | 3/1971 | Bak | 73/290 R |
| 4,006,637 | 2/1977 | Kinosita | 73/313 |
| 4,083,250 | 4/1978 | Goff | 374/201 |
| 4,170,135 | 10/1979 | Booman | 73/290 R |
| 4,186,591 | 2/1980 | Mooney | 73/292 |
| 4,362,403 | 12/1982 | Mooney | 374/4 |

FOREIGN PATENT DOCUMENTS

| | | | |
|---|---|---|---|
| 205387 | 1/1909 | Fed. Rep. of Germany | 374/201 |
| 467038 | 7/1952 | Italy | 374/55 |
| 2068123 | 8/1981 | United Kingdom | 374/56 |

*Primary Examiner*—William A. Cuchlinski, Jr.
*Attorney, Agent, or Firm*—Henry M. Bissell

[57] ABSTRACT

The rate of leaking from a liquid storage tank may be accurately determined by measuring the change in volume of the tank over a period of time, and during said same period (or during a period immediately before or after said measuring period, or both,) measuring the change in length of a probe which extends from the bottom of the tank to the top, and calculating, from the change in length of said probe, the change in volume of the liquid in the tank due to changes in temperature throughout the entire height of the tank. In one embodiment of the invention, the probe is a rod of material which has a high coefficient of thermal expansion and which is inert to the liquid being tested. Since each segment of the rod assume a length which is a function of the temperature at the level of that segment, the rod assumes a length which is a function of the integrated temperatures from the top of the bottom of the tank. Therefore changes in length of the rod are proportional to the total change in volume of the liquid due to temperature change. This change in volume may be applied algebraically to the total measured change in volume to obtain the change in volume due to leakage.

9 Claims, 3 Drawing Sheets

METHOD AND APPARATUS FOR MEASURING THE CHANGE IN VOLUME WITH CHANGE IN TEMPERATURE OF LIQUID IN TANKS

BACKGROUND OF THE INVENTION

In the testing of underground tanks for small leaks of the order of 0.1 gallon per minute or less, it has been found that the change in volume of the liquid in the tank caused by a change in temperature during the period of the test can be greater than the change in volume due to the leak.

For example, the specifications of the National Fire Protection Association require that testing equipment must be capable of detecting a leak as small as 0.05 gallon per hour, or about 0.19 cubic inches per minute. However in a 5000 gallon tank full of gasoline which has a coefficient of expansion of about 0.00065 per degree F.°, a change of temperature of only 0.01° F. amounts to about 0.0325 gallons, or 7.5 cubic inches. If the change in temperature of 0.01° F. occurs over a period of 1 hour, the change in volume will occur at the rate of about 0.125 cubic inches per minute. Since in the usual test method, the tank is filled shortly before the test is conducted, and since the temperature of the liquid added to the tank is almost always different from the temperature of the liquid already in the tank, which may itself be different from the surrouding ground temperature, rates of temperature change during the test usually exceed the above mentioned 0.01° F. per hour. Also, since temperature gradients exist in the tank, measuring the temperature at one point in the tank, even at the mid-point, during the test does not give an accurate measure of the change in volume of the tank liquid due to temperature during the test. Since the temperature gradient is not uniform from the top to the bottom of the tank, even measuring the temperature at a various depths will not necessarily give an accurate measure of the change in liquid volume.

SUMMARY OF THE INVENTION

In accordance with this invention, the rate of leaking from a liquid storage tank may be accurately determined by measuring the change in volume of the tank over a period of time, and during said same period (or during a period immediately before on after said measuring period, or both,) measuring the change in length of a probe which extends from the bottom of the tank to the top, and calculating, from the change in length of said probe, the change in volume of the liquid in the tank due to changes in temperature throughout the entire height of the tank. In one embodiment of the invention, the probe is a rod of material which has a high coefficient of thermal expansion and which is inert to the liquid being tested. Since each segment of the rod assumes a length which is a function of the temperature at the level of that segment, the rod assumes a length which is a function of the integrated temperatures from the top to the bottom of the tank. Therefore changes in length of the rod are proportional to the total change in volume of the liquid due to temperature change. This change in volume may be applied algebraically to the total measured change in volume to obtain the change in volume due to leakage.

In another embodiment of the invention the probe consists of a quantity of liquid, preferably of the type in the tank being tested, said quantity of liquid being contained in an elongated container which is held vertically in the tank, extending from substantially the bottom of the tank and extending upwardly to a position above the level of liquid in the tank, preferably into the tank fill pipe.

DESCRIPTION OF THE ILLUSTRATED EMBODIMENT

Figure 1:
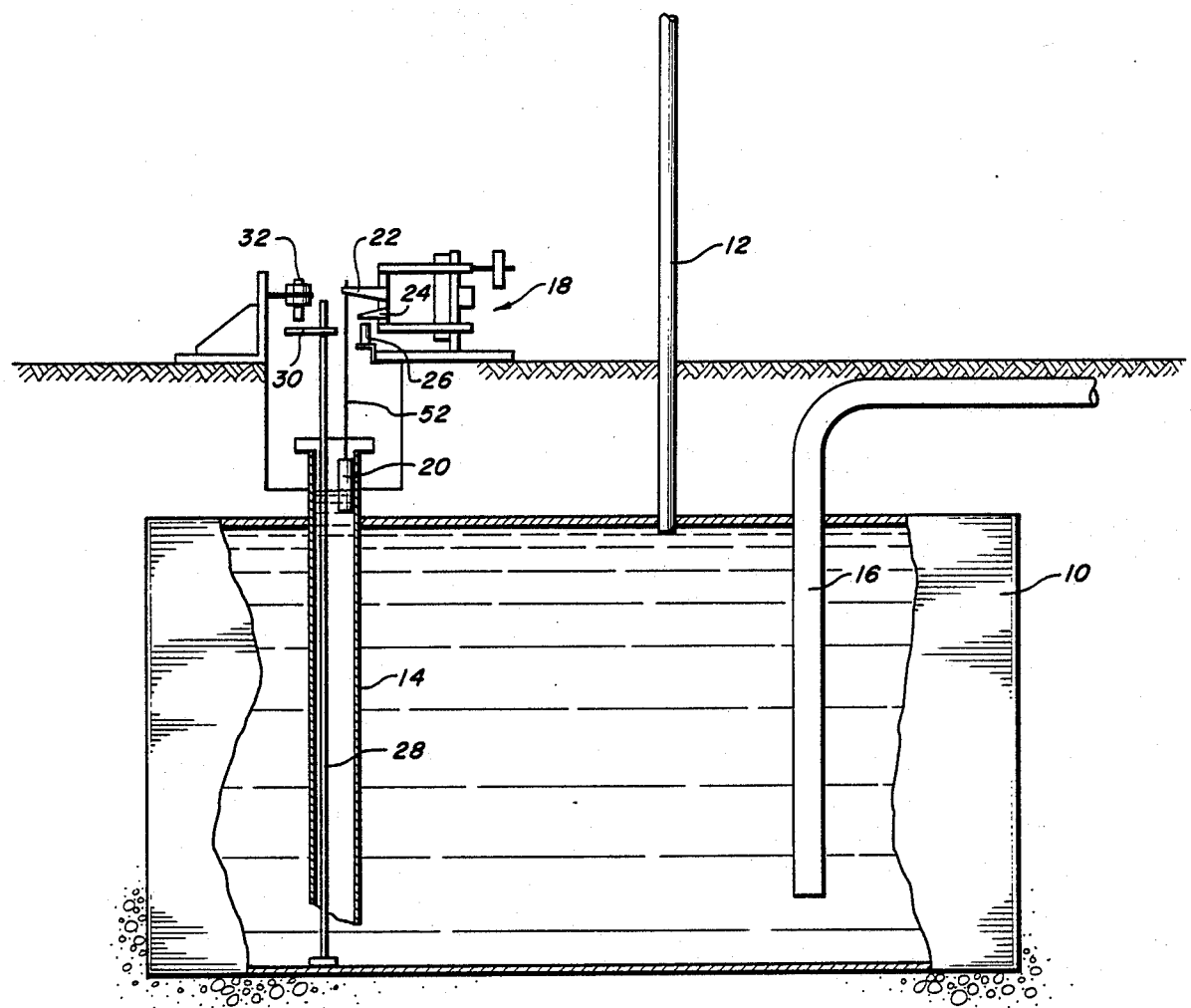
FIG. 1 is a schematic view of an underground tank to be tested for leakage, with test equipment embodying the features of the invention in position for carrying out a test by the method of the invention.

Referring to FIG. 1 of the drawing, there is illustrated a tank leak detecting apparatus which is particularly adapted for testing an underground tank 10 for small leaks. The tank 10 may be of the usual cylindrical type commonly used for gasoline storage, and is provided with a vent tube 12, a fill pipe 14, and a pump suction line 16.

The testing apparatus comprises a volume measuring apparatus which may include a weighing apparatus 18, a bouyancy member 20 for hanging into the fill tube 14 from a beam 22 of the weighing apparatus, and means for accurately measuring the beam deflection with changes in height of the liquid in the fill tube. Said measuring means may comprise a steel plate 24 disposed on the end of the beam, and an RF sensor 26 fixed to the frame of the weighing apparatus. The sensor 26 may be of the radio frequency type that radiates RF and generates eddy currents in the plate 24, which reduces the impedance of the sensor. The reduction impedance is transformed into a voltage that is linearly proportional to the distance from the sensor to the plate. Such devices are well known and are commercially available.

A type of RF sensor which may be used with the weighing apparatus has a change of output of 20 millivolts per mil change in distance to the target plate 24. If liquid is leaking out of the tank, the level of liquid in the fill pipe will drop, which will reduce the bouyant effect of the liquid on the bouyancy member 20 and allow the beam 22 to drop a distance which is related to the amount of the drop in liquid level.

The testing apparatus also comprises means for detecting the change in volume of the liquid in the tank due to temperature changes during the test period. In the embodiment of FIG. 1, said means comprises a rod 28 which has a length such that it can rest on the bottom of the tank and extend upwardly through the fill pipe 12. Means is provided for accurately measuring the length of the rod during the period of the test, or the period immediately before or just after the test, or both, so that the change in rod length for the period of the test can be determined.

In the embodiment of FIG. 1, the measuring means comprises a steel plate 30 attached to the rod above the top of the fill tube so as to extend laterally from the rod, and an RF sensor 32 attached to a fixed support such as the concrete surface over the tank or to the tank fill pipe. The sensor 32 may be of a type having a change of 200 millivolts in output per mil change in distance from the sensor to the plate 30.

In the embodiment of FIG. 1, the rod 24 is made of material inert to the liquid in the tank and which also has a high coefficient of thermal expansion. A rod made of phenolic resin impregnated cloth has been found satisfactory. Such a rod has a coefficient of thermal expansion of about 0.00032 inches/inch/degree F. Therefore a 72 inch rod, which is a satisfactory length for the usual cylindrical 5000 gallon tank, will inceraase in length 0.0023 inches with a 1° F. rise in temperature. Since each segment of the rod assumes a length which is a function of the temperature of the liquid surrounding that segment, the rod, when inserted into the tank, will assume a length which is a function of the temperatures in all segments of the liquid surrounding the rod. Since the total volume of the liquid in the tank at any one instant is a function of the temperature of all of the segments, the change in length of the rod is proportional to the change in volume of the liquid in the tank due to temperature.

The change in temperature throughout the tank occurs slowly after the tank is filled, however the rate of change is significant, since the test for leaks must be carried out over an extended period of time.

In a typical test on an underground gasoline tank, the tank is filled so that liquid rises into the fill pipe, and thereafter the level in the fill pipe is measured by the sensor 26, with the change in level being represented by a change in output millivolts of the sensor. If the sensor is originally spaced from the target a distance such that it provides an output of 1500 millivolts, and the output increases to 19880 millivolts during the period of the test, the difference of 18380 millivolts represents an increase in sensor to target distance of 0.919 inches, since the sensor provides a voltage change of 20 millivolts per mil. If the internal diameter of the pipe is 4.0 inches, this represents a loss of volume of 11.55 cubic inches per hour, or 0.05 gallons per hour, which would make it appear that the tank just barely meets the requirements of the National Fire Protection Association.

However, during the same period, the temperature sensor 32 shows an increase of 30 millivolts, representing an increase in length of the probe of 0.00015 inches. Applying the coefficient of thermal expansion of the rod material 0.000032 inches/in./deg. F.) it is found that the average temperature of the contents of the tank have increased by 0.1° F. over the period of the test, and therefore the volume of the 5000 gallons of gasoline in the tank has increased by 0.325 gallons, or 75.08 cubic inches. If the tank had no leak in or out, this would cause a rise of 5.97 inches in the fill pipe. Since during the period of the test, the level in the fill pipe fell 0.945 inches, representing a loss of 11.55 cubic inches, the total leakage during the test was 86.63 cubic inches, or 0.375 gallons per hour, or about 7.5 times the allowable leakage rate. Thus it is seen that the measurement of the temperature of the liquid in the tank during the period of the test is a critical factor in determining the rate of leakage into or out of the tank.

Figure 2:
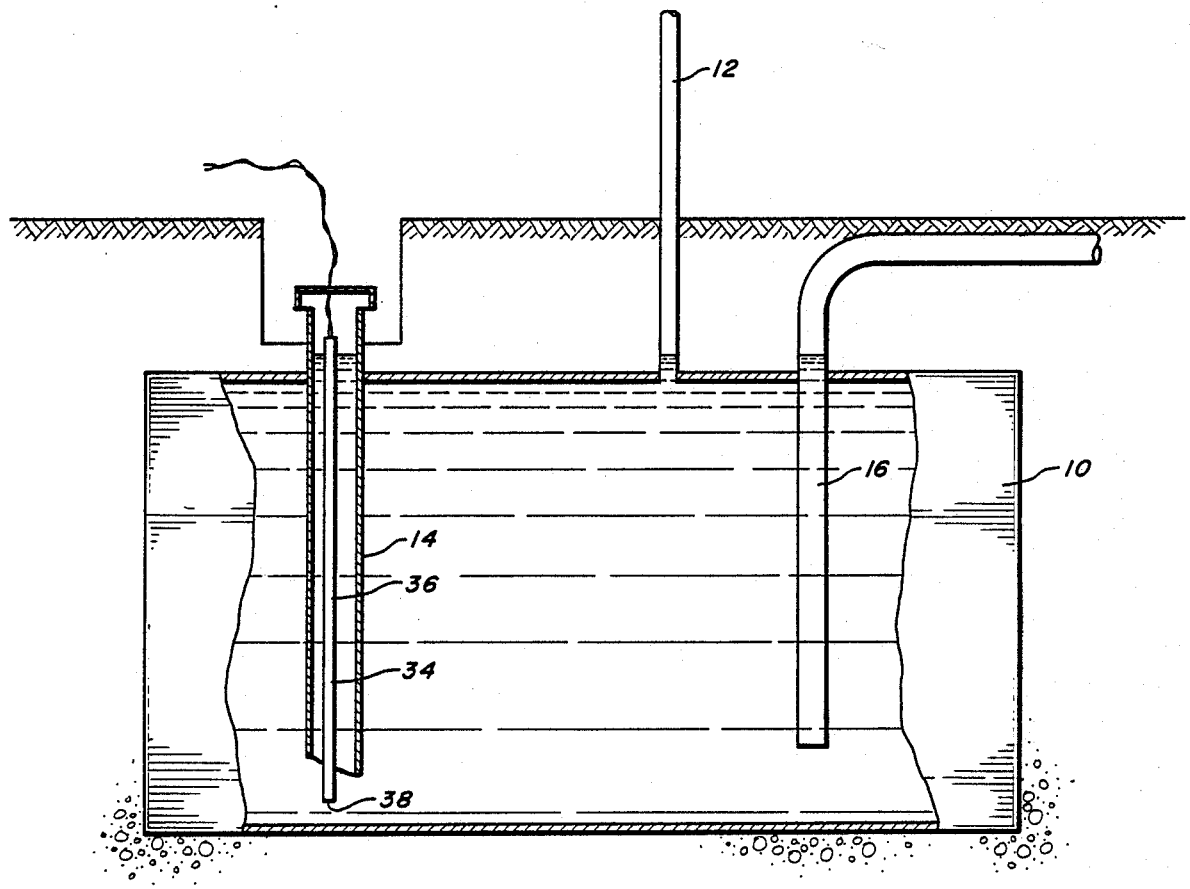
FIG. 2 is a schematic view of the underground tank with test equipment using a modified form probe.
Figure 3:
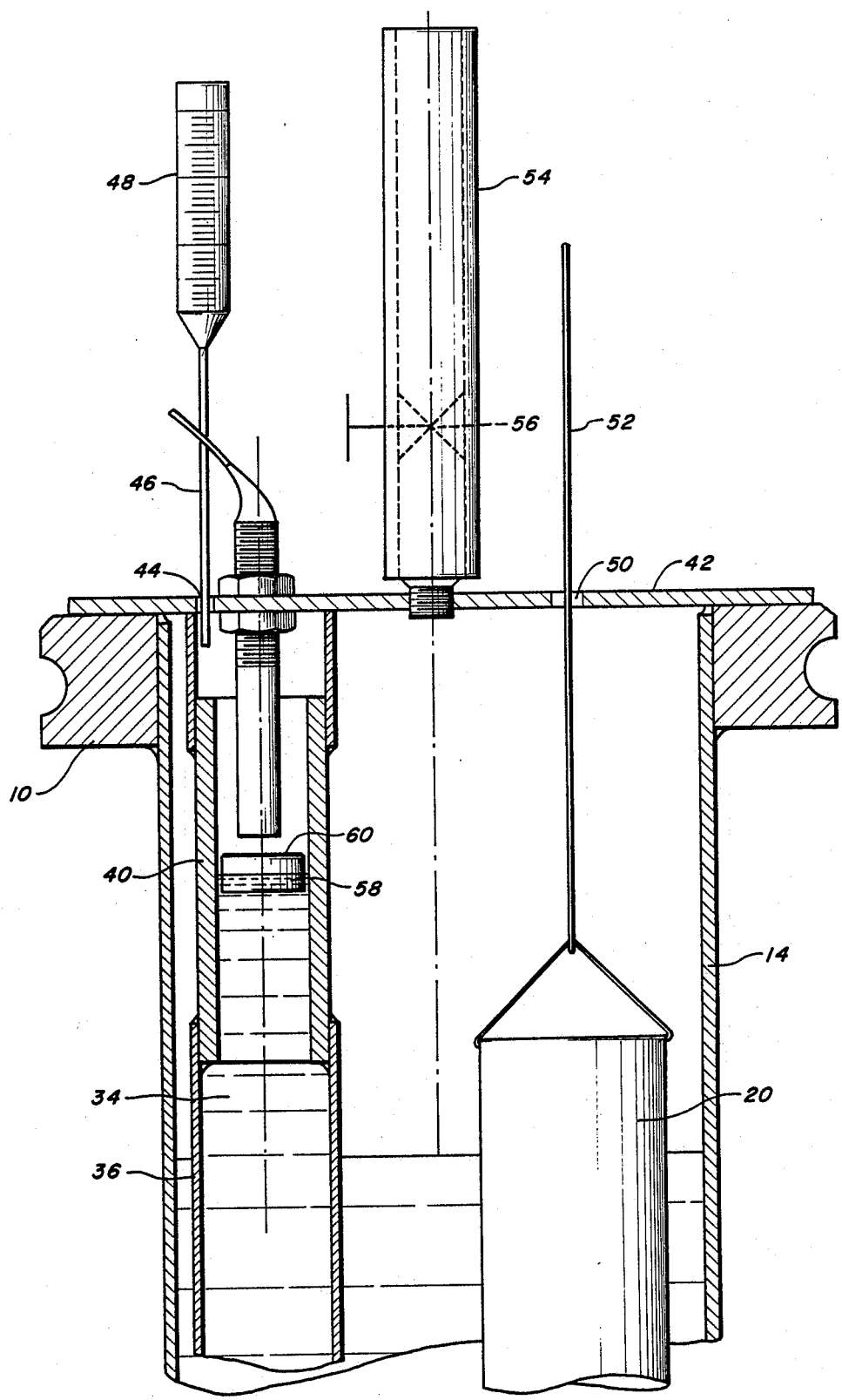
FIG. 3 is an enlarged view of a probe as shown in FIG. 2 with other asscociated equipment.

Referring now to FIGS. 2 and 3 of the drawing, there is illustrated a temperature testing apparatus using a modified form of probe for insertion into the tank for detecting changes in volume of the liquid in the tank due to temperature changes of the liquid.

In the embodiment of FIGS. 2 and 3, the probe comprises an elongated cylinder 34 of liquid, which preferably is the same type of liquid as is contained in the tank, and may be liquid extracted from the tank. The cylinder 34 of liquid is contained in an elongated container 36 which has a closed bottom 38 and a top portion having an internal diameter appreciably less than the diameter of the lower portion. The container has a length such that when the bottom 38 thereof is at or near the bottom of the tank, the top portion 40 is positioned near the upper end of the fill pipe 14.

The container 36 may conveniently be mounted onto a cover plate 42 which is sized to be placed over the fill pipe opening during the test. The plate 42 carries the sensor 32, which is so mounted in the plate as to be capable of being adjusted vertically. An aperture 44 is provided in the plate for receiving the stem 46 of a graduated cylinder 48 which may be used to calibrate the sensor 32 as will appear hereinafter. A second opening 50 may be provided to receive the support cord 52 of the bouyancy member 20 used in conjunction with the weighing apparatus 18. A second graduated cylinder 54 may be assembled into the cover plate with a suitable valve 56 to allow a predetermined volume of liquid into the fill pipe to calibrate the sensor 26.

To provide a target for the sensor 32, a float 58 may be provided on the surface of the liquid 34 in the upper portion of the tube, said float having a metal plate 60 of a type suitable as a target for the sensor being used.

Although the sensors are rated at nominal millivolts per mil value, such as 50 or 200, this value is subject to adjustment over a limited range. Therefore it has been found advisable to calibrate each sensor at each test site. Such calibration also compensates for the specific gravity of the liquid in the tank, and may conveniently be done by adding (or subtracting) a measured amount of fluid from the tank to the fill tube 14, and, if the liquid probe is being used, to the container 36, and observing the change in output of the sensors. The exact change in millivolts per mil of change in position of the target may thereby be determined.

A test of the tank for leakage using the probe of FIGS. 2 and 3 may be carried out in the manner described hereinbefore in connection with the probe 28 of FIG. 1. However the liquid probe 34 is more sensitive than the probe of FIG. 1 for the following reasons. First, the probe of FIG. 1 provides an increase in length due only to the linear expansion of the rod, whereas the probe of FIGS. 2 and 3 provides an increase in length due to the increase in volume, since the liquid is confined in the container and any lateral expansion, is converted into increase in height. Second, the coefficient of expansion of a probe of gasoline is about 4.7 times the coefficient of expansion of a solid rod of any plastic material suitable for use as a probe.

Another advantage of the use of the liquid probe is the fact that if the probe liquid is taken from the liquid in the tank, the percentage change in tank volume is the same as the percentage change in probe volume. Therefore if the probe changes in volume (as determined by the change in level of the probe liquid in the upper portion of the container as indicated by the change in millivolts of the sensor output) by 0.0065%, then the 5000 gallons in the tank have increased in volume by the same percentage, or 0.325 gallons. Thus no knowledge of the actual temperature change of the liquid in the tank is required.

The container 36 for the liquid probe will, of course, be a material which has a coefficient of expansion which is much less than that of the liquid of which the probe is formed, so that the expansion or contraction of the container can be ignored in the test.

I claim:

1. The method of measuring the change in volume with change in temperature of a quantity of liquid in a tank, comprising placing in said tank a length of material having a known temperature coefficient of expansion in relation to the temperature coefficient of expansion of the liquid in the tank, said length of material having a length and orientation such that it extends substantially from the bottom of the liquid to the top thereof, measuring the change of length of said length of material over a period of time, and computing the change in volume of the liquid in the tank from the change in length of said length of material.

2. A method as set out in claim 1 in which said length of material is a rod of solid material.

3. A method as set out in claim 1 in which said length of material is of a contained liquid-in place thereof liquid.

4. A method as set out in claim 3 in which said liquid has the same temperature coefficient of expansion as the liquid in the tank.

5. A method as set out in claim 4 in which said length of contained liquid material is of the same composition as the liquid in the tank.

6. A test probe assembly for measuring the change in volume with change in temperature of a liquid in a tank, comprising an elongated rod of material having a known temperature coefficient of expansion in relation to the temperature coefficient of expansion of the liquid in the tank, said rod having a length such that it can extend from the bottom of the tank into the fill tube thereof, an RF target mounted on the rod, and an RF radiating and sensing device mounted in fixed relation to the tank in position for measuring the change of position of said target.

7. A probe assembly for measuring the change in volume with change in temperature of the liquid in a tank, comprising a support plate, an elongated container depending from the support plate to receive a liquid to serve as a probe, said container having a neck portion at the upper end which has a cross-sectional area substantially less than that of the remainder of the container, an RF radiating and sensing device associated with the container so as to enable it to radiate into the top of the container, and a target capable of reflecting the RF radiation, said target having an overall specific gravity less than the liquid probe and having a surface capable of reflecting the RF radiation.

8. A probe assembly as set out in claim 7 in which said RF sensor is mounted on the support plate so as to extend downwardly into the open end of the container.

9. A test probe assembly for measuring the change of volume with the change of temperature of a liquid in a tank, comprising:
   an elongated container having a closed bottom and an open top, said container having a portion at the upper end which has a cross-sectional area substantially less than that of the remainder of the container.
   a test probe in the container, said test probe comprising a liquid in the container.
   a target for RF energy floating on the top of the liquid in the container; and
   an RF radiation and sensing device associated therewith to measure the change in level of the target.

* * * * *

UNITED STATES PATENT AND TRADEMARK OFFICE
CERTIFICATE OF CORRECTION

PATENT NO. : 4,811,601
DATED : March 14, 1989
INVENTOR(S) : Peter J. Tolan and William E. Baird It is certified that error appears in the above—identified patent and that said Letters Patent is hereby corrected as shown below:

Title page:

[76] Peter J. Tolan, 30 Greenfield La.,
Scituate, Mass. 02066;
William E. Baird, 55 Red Gate La.,
Cohasset, Mass. 02025

Col. 2, line 38 should read --impedance of the sensor. The reduction in impedance is--.

Col. 5, lines 16-17 (Claim 3, lines 2-3) should read --of material is of a contained liquid.--

Signed and Sealed this

Twelfth Day of September, 1989

Attest:

DONALD J. QUIGG

Attesting Officer

Commissioner of Patents and Trademarks